(12) United States Patent
Balestrieri (10) Patent No.: US 8,073,433 B2
(45) Date of Patent: Dec. 6, 2011

(54) SYSTEM, METHOD, MOBILE TERMINAL AND COMPUTER PROGRAM PRODUCT FOR PROVIDING PUSH-TO-TALK CHAT IN INTERACTIVE MOBILE TV

(75) Inventor: Francesco Balestrieri, Helsinki (FI)

(73) Assignee: Nokia Corporation, Espoo (FI)

( * ) Notice: Subject to any disclaimer, the term of this patent is extended or adjusted under 35 U.S.C. 154(b) by 488 days.

(21) Appl. No.: 11/398,030

(22) Filed: Apr. 5, 2006

(65) Prior Publication Data
US 2007/0238447 A1 Oct. 11, 2007

(51) Int. Cl.
*H04Q 7/38* (2006.01)
(52) U.S. Cl. ........... 455/414.1; 455/412.1; 455/414.2; 455/518; 455/519; 455/406; 725/39; 725/86; 725/99; 725/106; 725/139
(58) Field of Classification Search .......... 455/90.2, 455/412, 414.1–414.2, 518–519, 406; 704/246, 704/235; 370/328; 709/231; 725/39, 86, 725/106, 139
See application file for complete search history.

(56) References Cited

U.S. PATENT DOCUMENTS

| | | | |
|---|---|---|---|
| 6,459,892 B2 * | 10/2002 | Burgan et al. ............ | 455/412.1 |
| 7,735,108 B2 * | 6/2010 | FitzGerald ................ | 725/106 |
| 2003/0003953 A1 | 1/2003 | Houplain | |
| 2003/0078972 A1 | 4/2003 | Tapissier et al. | |
| 2004/0005900 A1 | 1/2004 | Zilliacus | |
| 2004/0073915 A1 * | 4/2004 | Dureau ..................... | 725/9 |
| 2005/0073972 A1 | 4/2005 | Hasegawa | |
| 2006/0047511 A1 * | 3/2006 | Hussain .................... | 704/235 |
| 2006/0075429 A1 * | 4/2006 | Istvan et al. .............. | 725/39 |
| 2006/0121924 A1 * | 6/2006 | Rengaraju et al. ........ | 455/518 |
| 2006/0126556 A1 * | 6/2006 | Jiang et al. ................ | 370/328 |
| 2006/0205427 A1 * | 9/2006 | Laible et al. .............. | 455/518 |
| 2007/0168539 A1 * | 7/2007 | Day .......................... | 709/231 |

FOREIGN PATENT DOCUMENTS

| | | |
|---|---|---|
| EP | 1 111 926 A2 | 6/2001 |
| EP | 1 211 892 A2 | 6/2002 |
| WO | WO 02/32134 A1 | 4/2002 |

(Continued)

OTHER PUBLICATIONS

International Search Report for PCT Application No. PCT/IB2007/000874, Filed Apr. 3, 2007; Date of Completion Oct. 2, 2007; Date of Mailing Oct. 9, 2007.

(Continued)

*Primary Examiner* — Charles N. Appiah
*Assistant Examiner* — Michael Vu
(74) *Attorney, Agent, or Firm* — Ditthavong Mori & Steiner, P.C.

(57) ABSTRACT

An apparatus for providing an interactive service during a broadcast service includes a transmitting element and a processing element. The transmitting element is capable of communicating broadcast content of the broadcast service to a plurality of receiving terminals. The processing element is configured to at least partially control the transmitting element. The processing element is configured to communicate with a network device in order to request a program specific group for communication of the interactive service to a receiving terminal that is a member of the program specific group. The interactive service is communicated to the receiving terminal that is a member of the program specific group with reception of the broadcast service. The content associated with the interactive service originates from the receiving terminals.

24 Claims, 6 Drawing Sheets

FOREIGN PATENT DOCUMENTS

| | | |
|---|---|---|
| WO | WO 03/034735 A1 | 4/2003 |
| WO | WO 03/088666 | 10/2003 |
| WO | WO 03/090484 | 10/2003 |
| WO | WO 2005/013617 A1 | 2/2005 |
| WO | WO 2005/094096 | 10/2005 |

OTHER PUBLICATIONS

Written Opinion for PCT Application No. PCT/IB2007/000874, Filed Apr. 3, 2007; Date of Completion Oct. 2, 2007; Date of Mailing Oct. 9, 2007.

*Telecommunications and Internet Converged Services and Protocols for Advanced Networking (TISPAN); NGN Generic Capabilities and Their Use to Develop Services;* ESTI TR 181 004 V1.1.1 (Mar. 2003); ETSI Standards, European Telecommunications Standards Institute; Sophia-Antipo, France ; (Journal Article).

*Human Factors (HF); Guidelines for the Design and Deployment of ICT Products and Services Used by Children;* ESTI EG 202 423 V1.1.1 (Oct. 2005); ETSI Standards, European Telecommunications Standards Institute; Sophia-Antipo, France; (Journal Article).

Chinese Office action for corresponding CN App. No. 200780018400.3 dated May 20, 2010, pp. 1-16.

European Office action of corresponding EP App. No. 07734195.6-2223 dated Jun. 21, 2010, pp. 1-6.

European search report for corresponding EP App. No. 07734195.6-2223 dated Jun. 4, 2010, pp. 1-4.

* cited by examiner

SYSTEM, METHOD, MOBILE TERMINAL AND COMPUTER PROGRAM PRODUCT FOR PROVIDING PUSH-TO-TALK CHAT IN INTERACTIVE MOBILE TV

FIELD OF THE INVENTION

Embodiments of the present invention relate generally to wireless technology and, more particularly, relate to enabling a mobile terminal to deliver chat services in conjunction with a mobile television broadcast.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to processing and display of video streams at a mobile terminal. Accordingly, digital broadband data broadcast networks have been developed such as, for example, digital video broadcasting (DVB), Japanese Terrestrial Integrated Service Digital Broadcasting (ISDB-T), Digital Audio Broadcasting (DAB), Multimedia Broadcast Multicast Service (MBMS), and those networks provided by the Advanced Television Systems Committee (ATSC). In this regard, digital broadband data broadcast networks enjoy popularity in Europe and elsewhere for the delivery of television content as well as the delivery of other data, such as Internet Protocol (IP) data. Several variants of the DVB standard exist, for example, DVB-T (terrestrial), DVB-H (handheld), DVB-C (cable) and DVB-S (satellite). DVB-H (handheld), for example, can provide increased performance particularly for wireless data delivery to handheld devices.

With the development of improved means for delivery of video data, a demand has grown for services that offer interactive aspects incorporated along with aspects of television viewing. Thus, a need exists for providing interactive services transmitted as part of or along with a video data stream.

BRIEF SUMMARY OF THE INVENTION

A system, method, apparatus and computer program product are therefore provided which allows a user of a mobile terminal, and particularly a user of a mobile television terminal, to engage in interactive chat during a video broadcast. For example, push-to-talk over cellular chat content may be incorporated into a video data stream or transmitted in addition to the video data stream. Accordingly, the user of the mobile terminal may simply push a button on the mobile terminal to enable one-to-many voice communications which are delivered as part of or along with the video data stream.

According to an exemplary embodiment, an apparatus for providing an interactive service during a broadcast service is provided. The apparatus includes a transmitting element and a processing element. The transmitting element is capable of communicating broadcast data of the broadcast service to a plurality of receiving terminals. The processing element is configured to at least partially control the transmitting element. The processing element is configured to communicate with a network device in order to request a program specific group for communication of the interactive service to a receiving terminal that is a member of the program specific group. The interactive service is communicated to the receiving terminal that is a member of the program specific group simultaneous with reception of the broadcast service. The content associated with the interactive service originates from the receiving terminals.

According to an exemplary embodiment, a mobile terminal for providing an interactive service during a broadcast service is provided. The mobile terminal includes an interface element and a processing element. The processing element is in communication with the interface element and is configured to transmit the interactive service to a first network device in response to activation of the interface element. The processing element is further configured to receive the interactive service from the first network device with reception of the broadcast service.

According to an exemplary embodiment, a computer program product for providing an interactive service during a broadcast service is provided. The computer program product includes at least one computer-readable storage medium having computer-readable program code portions stored therein. The computer-readable program code portions include first and second executable portions. The first executable portion is for providing a program guide including at least one program including an address associated with a program specific group to at least one receiving terminal. The second executable portion is for transmitting data of the broadcast service for receipt at the least one receiving terminal with the interactive service. The interactive service is capable of origination at the at least one receiving terminal.

According to an exemplary embodiment, a method for providing an interactive service during a broadcast service is provided. The method includes providing a program guide including at least one program including an address associated with a program specific group to at least one receiving terminal, and transmitting data of the broadcast service for receipt at the least one receiving terminal with the interactive service. The interactive service is capable of origination at the at least one receiving terminal.

According to an exemplary embodiment, a system for providing an interactive service during a broadcast service is provided. The system includes a first network device, a broadcast provider and at least one receiving terminal. The first network device is capable of hosting conversations between members of a particular group. The broadcast provider is configured to communicate with the first network device in order to request a program specific group. The broadcast provider is configured to transmit the broadcast service. The at least one receiving terminal is configured to transmit the interactive service to members of the program specific group via the first network device in response to activation of an interface element of the at least one receiving terminal. The at least one receiving terminal is further configured to receive the broadcast service from the first network device with reception of the interactive service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
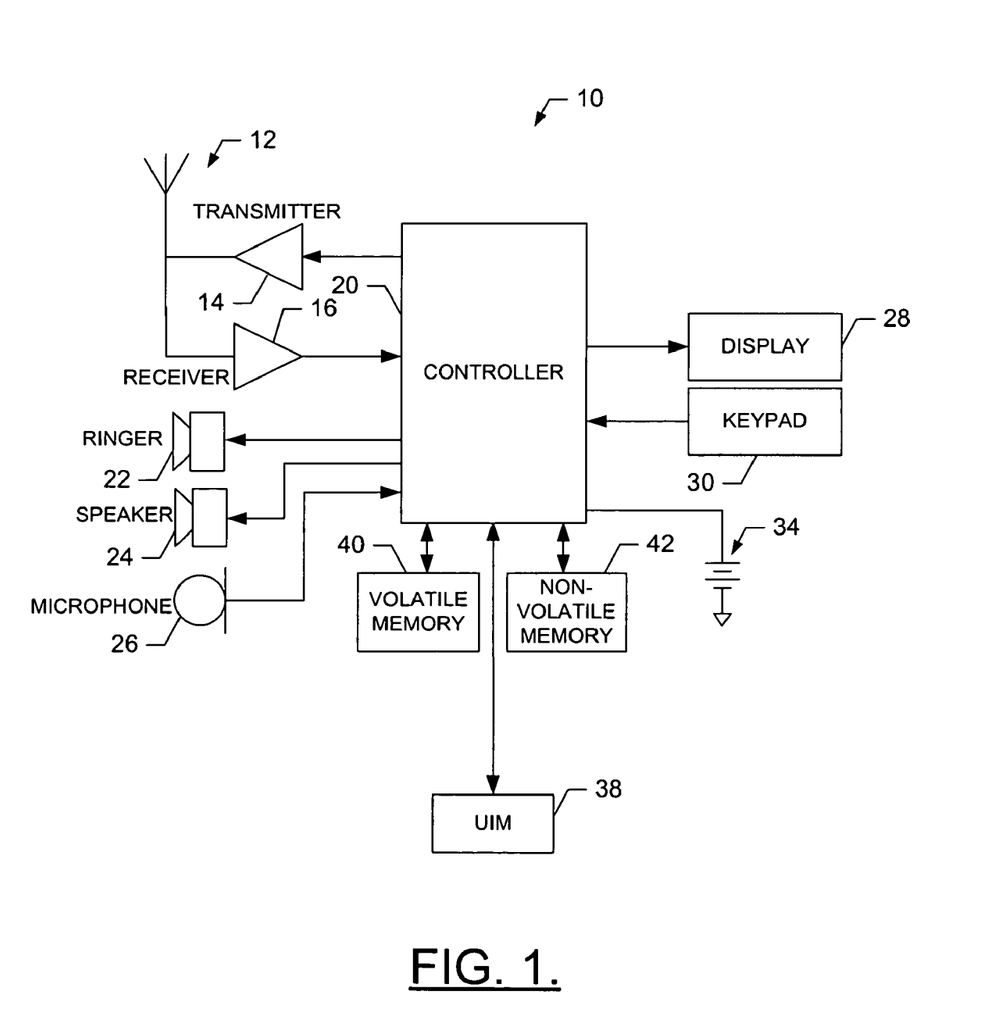
FIG. 1 is a schematic block diagram of a mobile terminal according to an exemplary embodiment of the present invention.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, laptop computers, mobile televisions, digital cameras and camcorders, audio players, video players, GPS devices, and any combinations of the aforementioned devices, and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular telecommunication system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA. In an exemplary embodiment, both broadcast digital data and cellular network communication data may be received at the antenna 12. In an alternative exemplary embodiment, the mobile terminal 10 may include one or more antennae. In such a situation, for example, one antenna may receive broadcast digital data, while the second antenna may receive cellular network communication data and the third antenna may receive analog or digital radio broadcasting.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of creating an authorization for delivery of location information regarding the mobile terminal 10, in accordance with embodiments of the present invention (described below).

The mobile terminal 10 also comprises a user interface including a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output. The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
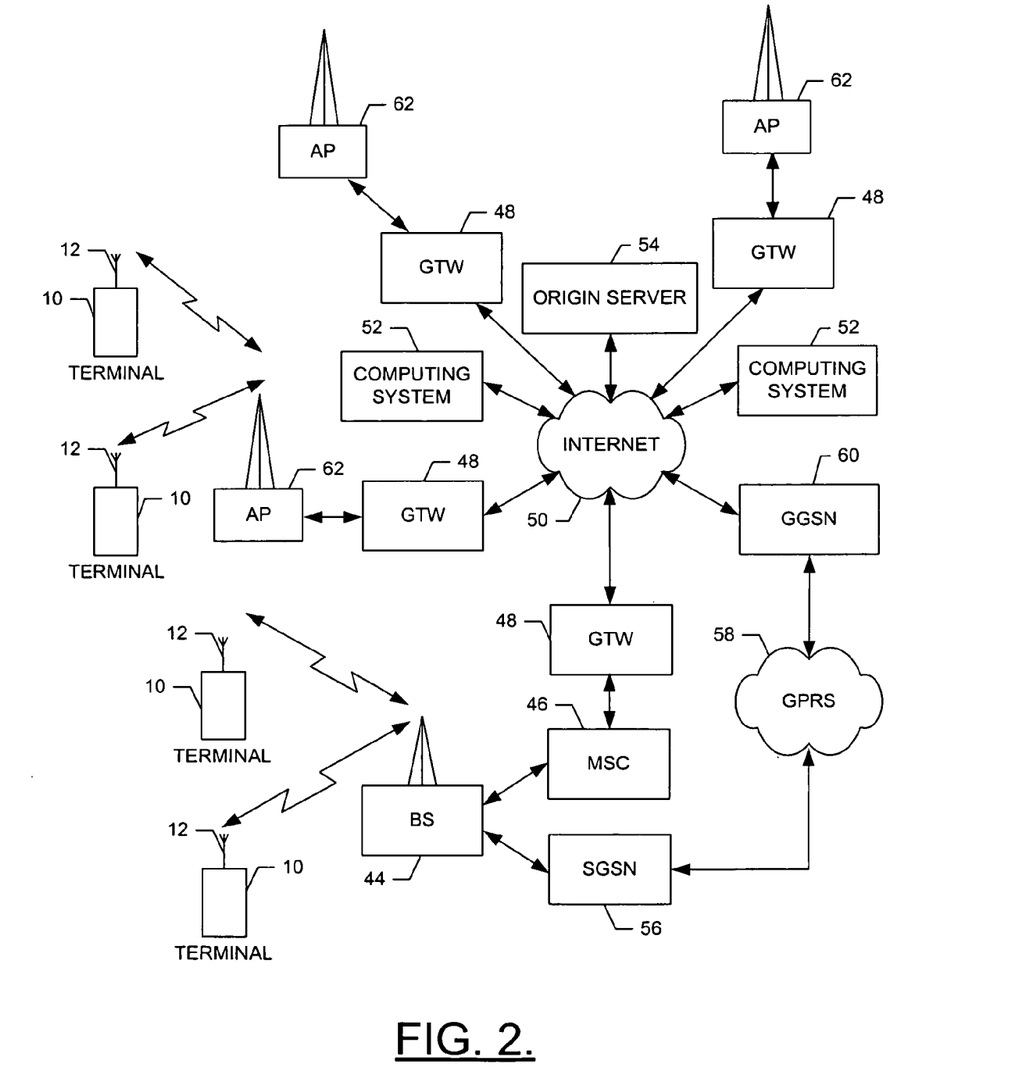
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include one or more antennae 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
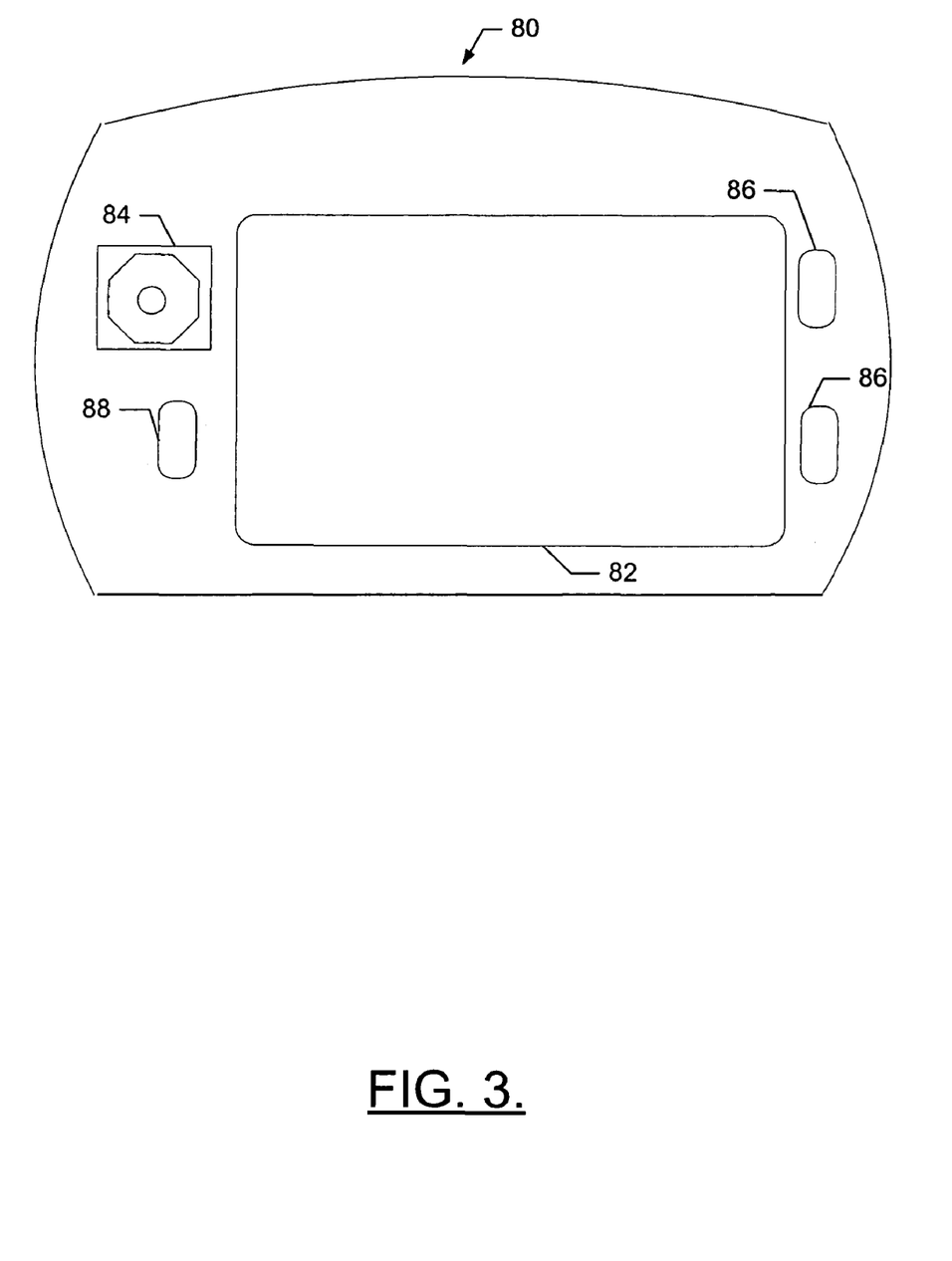
FIG. 3 illustrates a front view of a mobile terminal according to an exemplary embodiment of the present invention.

Although an exemplary embodiment of the invention will now be described with reference to FIG. 3, it should be noted that the mobile terminal 10 of FIG. 1 and numerous other mobile terminals may also be used to implement the present invention. Reference is now made to FIG. 3, which illustrates a front view of a mobile terminal 80 in accordance with an exemplary embodiment of the present invention. It should be understood that the mobile terminal 80 of FIG. 3, may include substantially similar capabilities and elements to those of the mobile terminal 10 of FIG. 1. However, the mobile terminal 80 of FIG. 3 may also include additional features, some of which are shown in FIG. 3. In an exemplary embodiment, the mobile terminal 80 is a mobile television set. Accordingly, the mobile terminal 80 is capable of receiving and displaying video broadcast data at a display 82, while simultaneously delivering related audio broadcast data via a speaker similar to that shown in FIG. 1. Additionally, the mobile terminal 80 may have the ability to function as a mobile telephone capable of accepting user voice input at a microphone similar to that shown in FIG. 1 and subsequently transmitting and receiving voice data while in communication, for example, with the BS 44 of FIG. 2.

Unlike the embodiment described with reference to FIG. 1, the mobile terminal 80 of this exemplary embodiment does not employ a keypad. Instead, the mobile terminal 80 includes the display 82 and a user interface. The user interface includes a touch pad 84 and various push buttons 86, which may be manipulated in order to select an object. In this regard, the touch pad 84 may be used to scroll an interface device such as a cursor over the display 82 in order to select objects or items, for example, from a menu or by clicking on items displayed on the display 82. For example, the touch pad 84 may be manipulated until the cursor is disposed over an object, an icon or a menu item and clicked. Alternatively, if the display 82 includes a touch screen, a pen, a finger or other implement may be used to click on and select the object. In response to selection of the object, by clicking or any other suitable mechanism, a predefined or user defined function associated with the object may be accessed.

The mobile terminal 80 may be capable of engaging in push-to-talk chat or any other text or voice based real time conversation enabling mechanism by which a user of the mobile terminal 80 can receive conversation data from one or a plurality of other mobile terminal users of a predefined group and transmit conversation data to be shared with the other mobile terminal users of the group. In this regard, the mobile terminal 80 may include an interface element such as, for example, a push-to-talk button 88. The interface element may be any device or means embodied in hardware, software or a combination of hardware and software that is capable of performing the functions described below. When the interface element is operated (i.e., when the push-to-talk button 88 is pressed), the controller 20 accepts a voice input from the user of the mobile terminal 80, for example, at a microphone of the mobile terminal 80 and causes the mobile terminal 80 to transmit voice data generated responsive to the voice input to, for example, the BS 44 for subsequent transmission via a chat service to the other mobile terminal users of the group.

Figure 4:
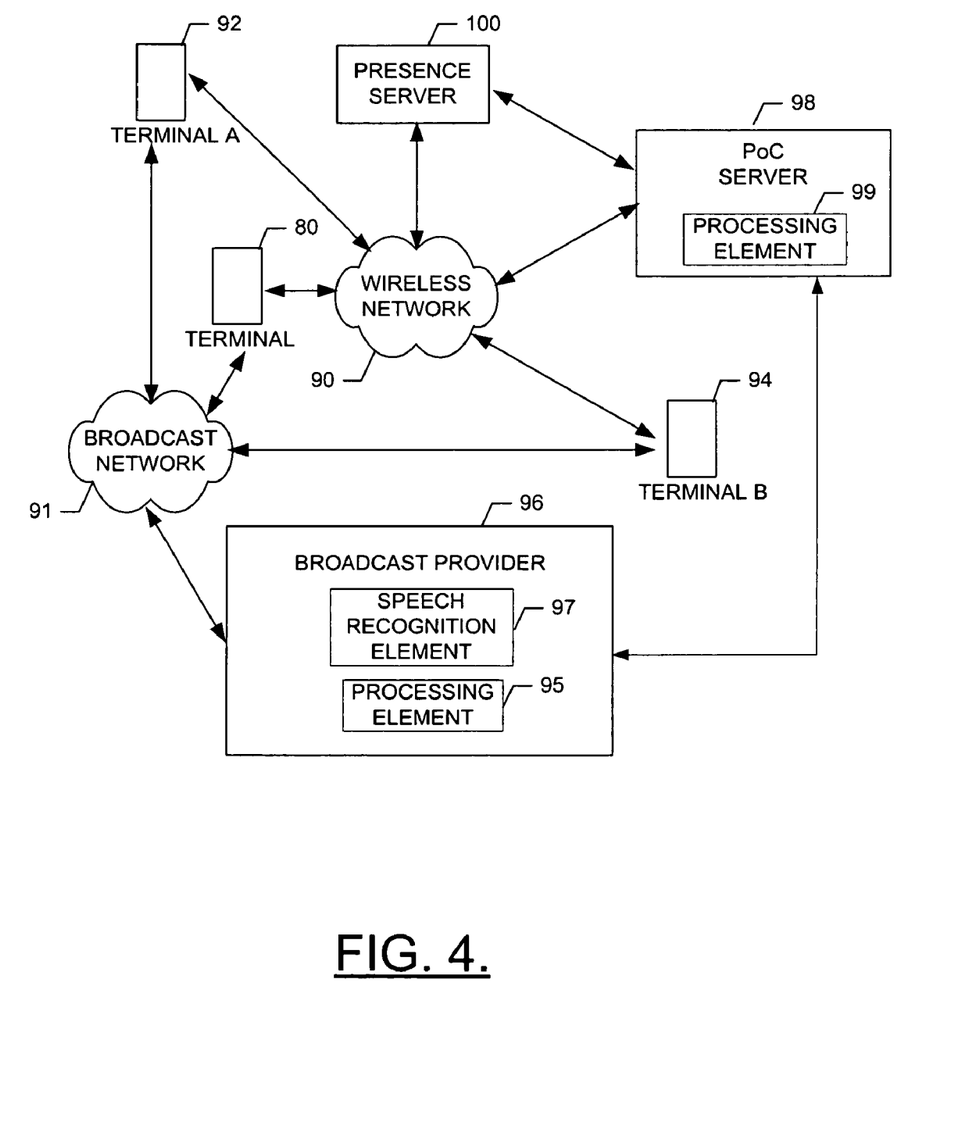
FIG. 4 is a schematic block diagram of a wireless communications system for providing push-to-talk based chat in interactive mobile television according to an exemplary embodiment of the present invention.

FIG. 4 is a schematic block diagram of a wireless communications system for providing push-to-talk based chat in interactive mobile television according to an exemplary embodiment of the present invention. The system includes the mobile terminal 80, which may be in communication with a wireless network 90 along with other mobile terminals including, for example, Terminal A 92 and Terminal B 94. In an exemplary embodiment, the system further includes a broadcast provider 96 which is capable of broadcasting digital television (TV) content and/or digital or analog radio broadcasting content to any of the terminals 80, 92 and 94 either directly, or via a broadcast network 91 as shown in FIG. 4. The wireless network 90 and the broadcast network 91 may each be any suitable network. For example, the wireless and broadcast networks 90 and 91 may be any corresponding one of the networks described above with reference to FIG. 2. The system may also include network devices such as a push-to-talk over cellular (PoC) server 98 and a presence server 100. It should be noted, that although FIG. 4 is described in reference to the PoC server 98, any device or means embodied in hardware, software, or a combination of hardware and software which is capable of providing functionality to permit management and/or operation of a real time or interactive chat services among multiple users. Thus, the PoC server 98 is merely exemplary and should not be considered as limiting the present invention.

In an exemplary embodiment, the PoC server 98 includes a processing element 99 that controls operation of the PoC server 98. The processing element 99 may communicate signals to and/or from the wireless network 90. The PoC server 98 provides the interactive chat services to group members or subscribers to a chat service. Accordingly, for purposes of describing the present embodiment, it will be assumed that each of the terminals 80, 92 and 94 are subscribers to the chat service. In order to join or start a conversation, each of the terminals 80, 92 and 94 may issue a call to the PoC server 98 to join a particular group. Details about the particular group may be accessed by any of the terminals 80, 92 and 94 after the call is made. For example, the details may include, the name of the particular group and a list of group members that are currently active (i.e., involved in or monitoring a current conversation). Generally speaking, when the push-to-talk button 88 of the mobile terminal 80 is pushed while connected to the PoC server 98, the mobile terminal 80 accepts voice input from the user of the mobile terminal 80. The voice input is processed by the mobile terminal 80 and transmitted to the PoC server 98 as voice data which includes chat conversation content via the wireless network 90. In an exemplary embodiment, the PoC server 98 then communicates the voice data to each of the other group members (i.e., Terminals A and B)

again via the wireless network 90. Exemplary embodiments of the present invention further enable the chat service to be provided in addition to or as part of a video data broadcast such as, for example, during a DVB-H program broadcast as described in greater detail below.

The presence server 100 may be any device or means embodied in hardware, software, or a combination of hardware and software which is capable of providing and/or managing presence information for consumption by users of the terminals 80, 92 and 94. Presence information may include information that is accessible to other users to inform the other users that a particular terminal is available for PoC interaction. Presence information may also include rules that govern which other users are allowed to receive information about the particular terminal. For example, if it is assumed that Terminal A 92 and Terminal B 94 are operated by other users, and the user of the mobile terminal 80 is considering making a call to the PoC server 98 to engage in chat services, the user of the mobile terminal 80 may access the presence server 100 via the wireless network 90 to determine which terminals are currently available for chat services. Assuming further that both Terminal A 92 and Terminal B 94 are actually available, the user of the mobile terminal 80 may receive an indication that either/or both of Terminal A 92 and Terminal B 94 are available depending upon whether Terminal A 92 and Terminal B 94 have rules that exclude the mobile terminal 80 from receiving such information and the configuration of the presence server 100. In an exemplary embodiment, each time any terminal inquires as to the availability of another terminal, the presence server 100 queries an accept list and a reject list in the PoC server 98. The accept and reject lists define the rules regarding who should and should not be permitted to access information related to availability of the terminal inquired about. Each of the terminals 80, 92 and 94 may have a corresponding accept list defining other users that are allowed to view the availability of the corresponding terminals 80, 92 and 94 and a reject list defining users that are not allowed to view the availability of the corresponding terminals 80, 92 and 94. In other words, for example, if Terminal A 92 adds the mobile terminal 80 to the accept list, while Terminal B 94 adds the mobile terminal 80 to the reject list, the mobile terminal 80 will see that Terminal A 92 is available, while the mobile terminal 80 will not see that Terminal B 94 is available even though both Terminal A 92 and Terminal B 94 may actually be available. If, however, neither Terminal A 92 nor Terminal B 94 have added the mobile terminal 80 to either the accept or reject lists, then whether or not Terminal A 92 and Terminal B 94 are indicated as being available for a PoC call depends on a configuration of the presence server 100, which could be configured by default to either indicate availability of both terminals or not.

The presence server 100 therefore allows users to see who is online and available for a conversation before making the PoC call to a group, which may encourage calls or at least reduce a number of unsuccessful calls. It should be noted that although FIG. 4 shows the presence server 100, it is not necessary that the presence server 100 be implemented in order to practice embodiments of the present invention. Furthermore, the presence server 100 may be collocated with the PoC server 98. Alternatively, the functionality of the presence server 100 may be performed by a module or element of the PoC server 98.

In an exemplary embodiment, the broadcast provider 96 may include a processing element 95 for controlling operation of the broadcast provider 96. The broadcast provider 96 can be capable of directly or indirectly transmitting (e.g. multicasting or point-to-point casting) content to any digital broadcast receiving terminal such as the terminals 80, 92 and 94. The content may be delivered, for example, in accordance with a digital broadcasting technique, such as DVB-H. In this regard, the broadcast provider 96 can be capable of transmitting broadcast content via satellite, a DSL connection, a WLAN, or other wired or wireless communication.

In accordance with a number of digital broadcasting techniques, such as DVB-H, Internet Protocol (IP) Datacasting (IPDC) can be utilized to provide audio, video, data and/or other content to the terminals 80, 92 and 94. In this regard, the broadcast provider 96 can be capable of providing IP datacasting content to the terminals 80, 92 and 94 utilizing a digital broadcasting technique. DVB-H, for example, uses MPEG-2 transport streams, and as such, IP data can be encapsulated into DVB transmission signals sent from the broadcast provider 96. Data streams including IP datagrams can be supplied from several sources, and can be encapsulated by an IP encapsulator (not shown). The IP encapsulator, in turn, can feed the encapsulated IP data streams into the digital broadcasting (e.g., DVB-H) network.

The encapsulated IP data streams can then be transported to one or more transmission sites, where the transmission sites form cells of a data broadcasting network such as the broadcast network 91. For example, the encapsulated IP data streams can be transported to one or more transmission sites on an MPEG-2 transport stream for subsequent transmission over the air directly to the terminals 80, 92 and 94, or to a receiver station serving one or more terminals. As will be appreciated, the MPEG-2 transport stream, from production by the IP encapsulator, to reception by the terminals 80, 92 and 94 or the receiver station, may be uni-directional in nature. In this regard, IP packets containing the data can be embedded in multi-protocol encapsulation (MPE) sections that are transported within transport stream packets.

The broadcast provider 96 may provide mobile TV service and content. Program information for the mobile TV service may be delivered, for example, in an electronic service guide (ESG) or in an electronic program guide (EPG). In an exemplary embodiment, the ESG, for example, may indicate that a particular program correlates to a particular PoC chat group. Such indication may occur, for example, by use of an icon, a button, a soft-key, a hard-key, a link, or text indicating the correlation. Selection of the indication by the user of the mobile terminal 80 may link the user of the mobile terminal 80, for example, to the PoC server 98 via an address or uniform resource locator (URL) associated with the link. Thus, the particular program can be identified to viewers of the ESG as a program that offers concurrent capability to participate in interactive chat while viewing broadcast video and hearing broadcast audio corresponding to the particular program. For example, an icon next to a name of the particular program in the ESG may be used to indicate that the particular program correlates to the particular PoC chat group. If the user of the mobile terminal 80, for example, selects the particular program in the ESG, the mobile terminal 80 may automatically be entered into the particular PoC chat group via the link. However, under an alternative arrangement, the mobile terminal 80 may begin to receive broadcast content without being automatically entered into the particular PoC chat group without a request by the user of the mobile terminal 80. In other words, although the mobile terminal 80 receives the broadcast content, chat content may not be delivered to the mobile terminal 80 unless the user requests delivery of the chat content in addition to accessing the particular program in the ESG. Thus, in an exemplary embodiment, when the user selects the particular program in the ESG which correlates to the particular PoC chat group, an icon or other selectable item may be displayed on the mobile terminal 80 to allow the user to join the particular PoC chat group, for example, via the link being associated with the icon or other selectable item.

Accordingly, in an exemplary embodiment, the broadcast provider 96 may provide digital video content to the terminals 80, 92 and 94 while each of the terminals 80, 92 and 94 are substantially simultaneously engaged in a real time conversation as part of an interactive chat session hosted at the PoC server 98. Thus, any of the terminals 80, 92 and 94 may utilize the push-to-talk button 88 to share voice data or text data with each other member of the group. In an exemplary embodiment, the broadcast provider 96 may supply a single video stream over a transmission channel. The broadcast provider 96 may then provide one or more audio channels corresponding to the video stream over separate transmission channels. One or more of the audio channels delivering broadcast audio corresponding to the video stream may correspond to a PoC chat group. Thus, audio delivered to members of the PoC chat group may include the broadcast audio corresponding to the video stream and audio corresponding to the voice data from conversations generated among members of the PoC chat group. The audio corresponding to the voice data from the conversations may be interleaved with the broadcast audio.

In an exemplary embodiment in which more than one of the audio channels correspond to a PoC chat group, it may be possible to organize PoC chat groups by affinity or any other suitable distinction. For example, if a sporting event is being broadcast by the broadcast provider 96 there may be a single video stream transmitted and multiple corresponding audio streams. One of the audio streams may not include a PoC chat group while at least two other audio streams include a PoC chat group. Of the at least two other audio streams, one of the audio streams may include a PoC chat group designated for home team fans to chat, while another of the audio streams may include a PoC chat group designated for away team fans to chat.

The chat conversation content generated at each of the terminals 80, 92 and 94 is transmitted from each of the terminals 80, 92 and 94 when a corresponding interface element of each of the terminals 80, 92 and 94 is activated. The chat conversation content is transmitted to the PoC server 98, for example, via the wireless network 90. In an exemplary embodiment, the PoC server 98 may transmit chat conversation content received from one of the terminals 80, 92 and 94 to remaining ones of the terminals and any other terminals that are members of the PoC chat group via a wireless telecommunication connection, or a packet connection. In an alternative exemplary embodiment, the PoC server 98 may transmit the chat conversation content to the broadcast provider 96, which then transmits the chat conversation content to all receiving terminals capable of receiving and processing data from the broadcast provider 96. In this regard, the broadcast provider 96 may transmit the chat conversation content as audio data. In an alternative exemplary embodiment, the broadcast provider 96 may include a speech recognition element 97. The speech recognition element 97 may be any device or means embodied in hardware, software or a combination of hardware and software that is capable of converting an audio input into a text output. According to this exemplary embodiment, the chat conversation content is transmitted from the broadcast provider 96 to all receiving terminals as text corresponding to the voice data transmitted from the terminal 80, 92 or 94 that originated the voice data.

It should be noted that any combination of the above transmission methods may also be employed. For example, the PoC server 98 may transmit chat conversation content received from one of the terminals 80, 92 and 94 to remaining ones of the terminals and any other terminals that are members of the PoC chat group via the packet connection and also transmit the chat conversation content to the broadcast provider 96. The broadcast provider 96 may then convert a format of the chat conversation to text and transmit the text output for receipt by all receiving terminals.

Figure 5:
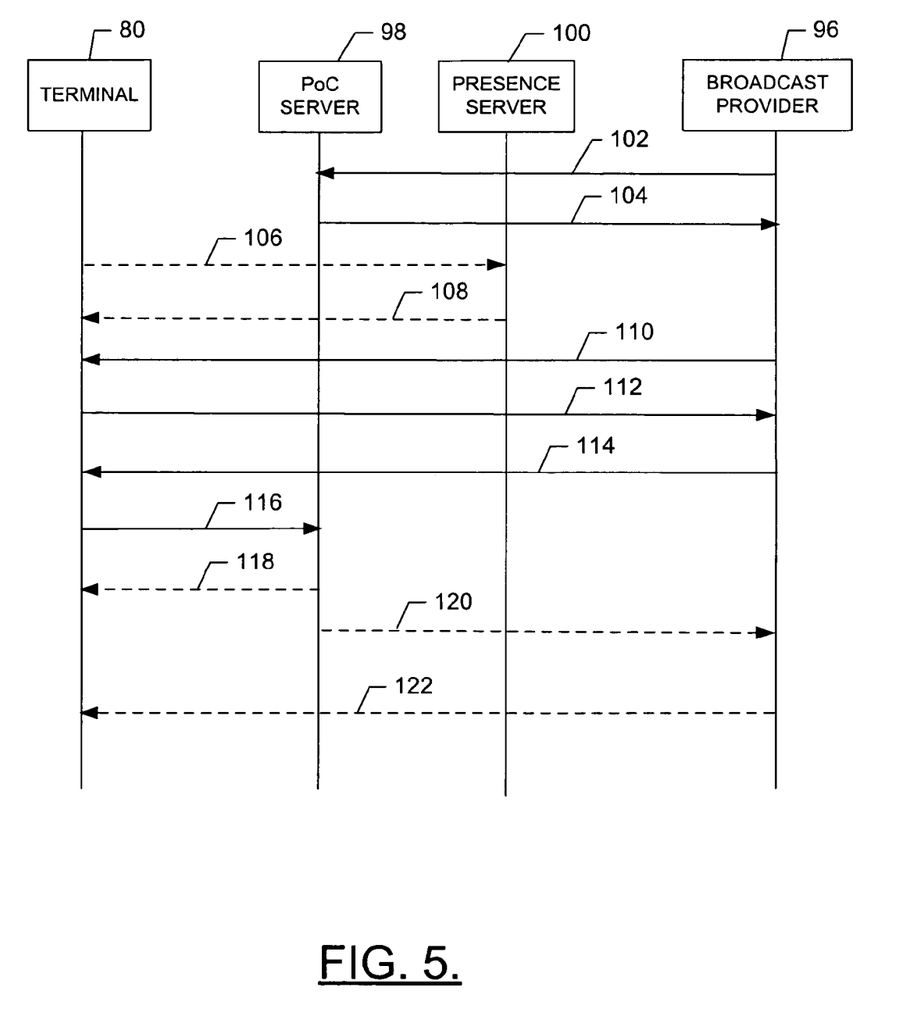
FIG. 5 is a control flow diagram illustrating a method of providing push-to-talk based chat in an interactive mobile TV according to an exemplary embodiment of the present invention.

FIG. 5 is a control flow diagram illustrating a method of providing push-to-talk based chat in an interactive mobile TV according to an exemplary embodiment. It will be understood that, in accordance with an exemplary embodiment of the present invention, signals shown in dotted lines are either optional or alternative in nature. Initially, a decision may be made, for example, by an operator at the broadcast provider 96, to create a PoC chat group to correspond with a particular television broadcast, such as a selected program. The broadcast provider 96 may then send a message 102 to the PoC server 98 requesting creation of the PoC chat group. In response to the request, the PoC server 98 sends a message 104 to the broadcast provider 96 to return a specification or address for the PoC chat group. The address may be, for example, a URL for a channel created to host the PoC chat group. The broadcast provider 96 may then update the ESG to indicate that the particular video broadcast is associated with the PoC chat group. Optionally, the mobile terminal 80 may access the presence server 100 at operation 106 to determine which other terminals are available to join the PoC chat group. The presence server 100 responds to queries from the mobile terminal 80 regarding the availability of other terminals to join the PoC chat group at operation 108.

The ESG 110 may be broadcast to other subscriber terminals including the mobile terminal 80. The other subscriber terminals may include both PoC enabled terminals and terminals that are not PoC enabled. After consulting the ESG, a program may be selected by the mobile terminal 80 and/or the other subscriber terminals from the ESG 110 that correlates to the PoC chat group via a message 112. Broadcast content 114 may then be sent to the mobile terminal 80 and/or the other subscriber terminals. In an additional exemplary embodiment, sending the message 112 is not necessary, but the terminal 80 adjusts itself to receive and/or decode the broadcast content 114. The broadcast content 114 may include broadcast video content and/or broadcast audio content and/or broadcast data content via either the same or separate channels. In response to activation of the interface element such as, for example, when a user of either the mobile terminal 80 or the PoC enabled terminals among the other subscriber terminals presses the push-to-talk button of their respective terminals, a voice input may be received at their respective terminals and transmitted as PoC chat conversation audio input 116 to the PoC server 98. In an exemplary embodiment, the mobile terminal 80 and the PoC enabled terminals among the other subscriber terminals receive PoC chat conversation audio output 118 from the PoC server 98 using normal PoC methods. In other words, only subscribers to the PoC chat group may receive PoC chat conversation audio in this exemplary embodiment. The PoC chat conversation audio may be interleaved with the broadcast audio content when heard at the mobile terminal 80 and/or the PoC enabled terminals among the other subscriber terminals. Alternatively, the PoC chat conversation audio may be transmitted via the wireless telecommunication network 90, and the terminal 80 renders the both PoC audio and broadcasting audio content.

In an alternative exemplary embodiment, the PoC server 98 may send the PoC chat conversation audio to the broadcast provider 96 so that the broadcast provider 96 as shown at line 120. Then the broadcast provider 96 may transmit the PoC chat conversation audio to the mobile terminal and/or the other subscribers along with the broadcast video content and the broadcast audio content as shown at line 122. In other words, in this exemplary embodiment, the PoC chat conversation audio is transmitted, for example, as a portion of the DVB-H transmission. Accordingly, both the PoC enabled terminals and the terminals that are not PoC enabled can receive the PoC chat conversation audio interleaved with the broadcast audio content when heard at the mobile terminal 80 and/or the other subscriber terminals.

It should be noted that although the preceding has been described in the context of audio PoC chat content, it is also envisioned that PoC chat content could be text, data or any combination of data, text and audio. Furthermore, embodiments of the present invention are not limited to interactive chat, but may also be applicable to simultaneous delivery of broadcast data and any interactive service. Additionally, although the preceding has been described in the context of video broadcast content, it should be noted that the broadcast content could also be radio, data such as games, or any combination of radio, television, and data content.

Figure 6:
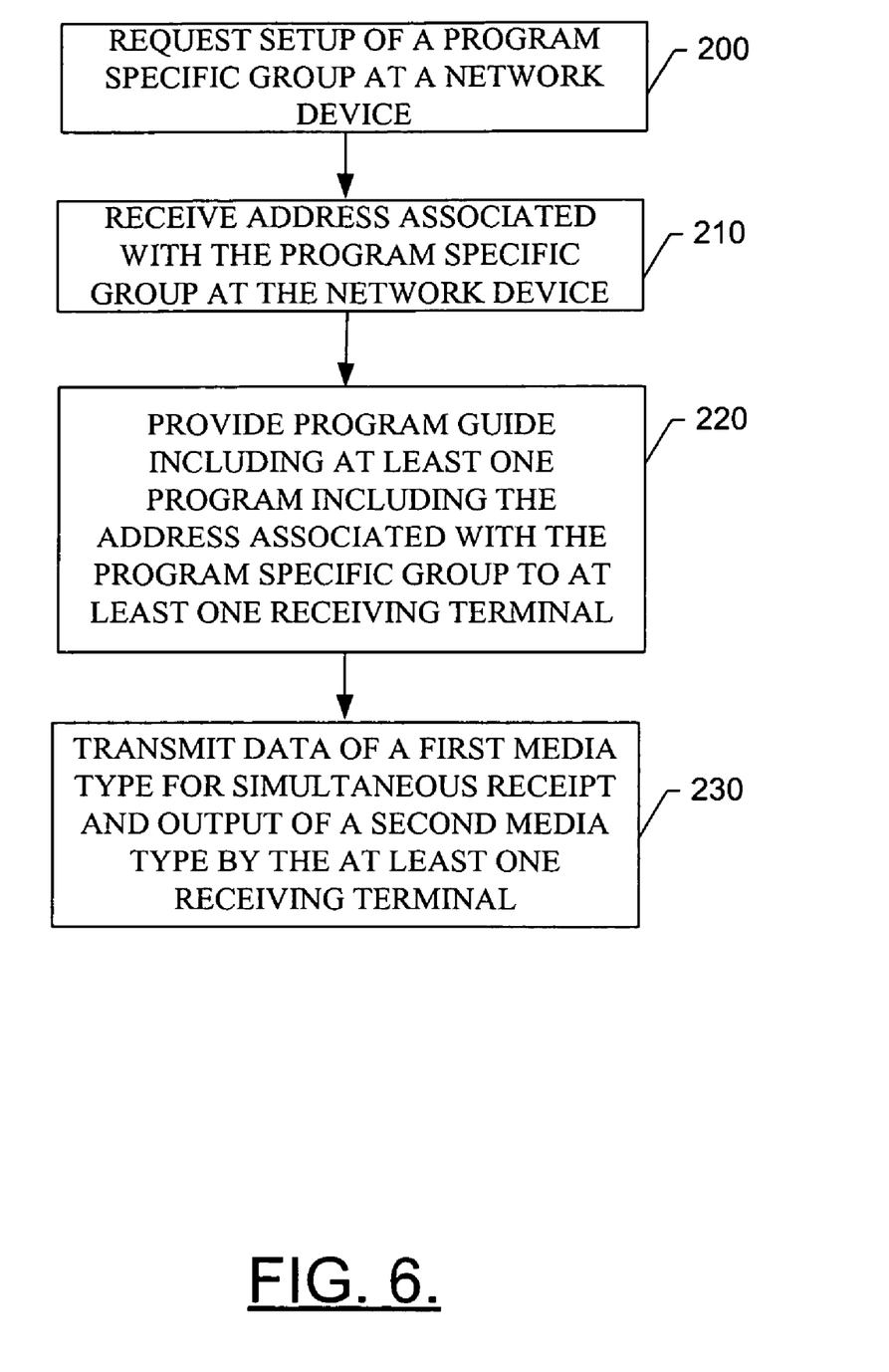
FIG. 6 is a flowchart according to an exemplary method of providing push-to-talk based chat in an interactive mobile TV according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and/or a server and executed by a built-in processor in the mobile terminal and/or the server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing interactive chat during a video broadcast includes requesting setup of a program specific group at a network device at operation 200. At operation 210, an address associated with the program specific group from the network device is received. At operation 220, a program guide including at least one program including the address associated with the program specific group to at least one receiving terminal is provided. At operation 230, data of a first media type is transmitted for simultaneous receipt and output of a second media type by the at least one receiving terminal. The second media type is capable of origination at the at least one receiving terminal.

The above described functions may be carried out in many ways. For example, any suitable means for carrying out each of the functions described above may be employed to carry out the invention. Furthermore, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining to provide, from a network entity, a program guide including at least one program of a broadcast service including an address associated with a program specific group having members including a plurality of receiving terminals to at least one receiving terminal of the program specific group; and
   determining to transmit, via a processor of the network entity, content of the broadcast service for presentation at the at least one receiving terminal along with interactive service content, wherein the interactive service content includes chat conversation content being capable of origination at one of the receiving terminals, and the content of the broadcast service being originated by the network entity, which is not a member of the program specific group.

2. The method of claim 1, further comprising requesting setup of the program specific group at the network entity.

3. The method of claim 2, further comprising receiving the address associated with the program specific group from the network entity.

4. The method of claim 3, wherein the broadcast service provides digital video broadcast data, and the method further comprises:
   receiving the chat conversation content as audio from the network entity;
   converting the chat conversation content to text; and
   delivering the text to the at least one receiving terminal.

5. The method of claim 3, wherein the broadcast service provides digital video broadcast data, and the method further comprises:
   receiving the chat conversation content as audio from the network entity; and delivering the chat conversation content to the at least one receiving terminal along with audio corresponding to the at least one program.

6. A non-transitory computer-readable storage medium carrying one or more sequences of one or more instructions which, when executed by one or more processors, cause an apparatus to at least perform the following steps:
   determining to provide, from a network entity, a program guide including at least one program of a broadcast service including an address associated with a program specific group having members including a plurality of receiving terminals to at least one receiving terminal of the program specific group; and determining to transmit content of the broadcast service for presentation at the at least one receiving terminal along with interactive service content, wherein the interactive service content includes chat conversation content being capable of origination at one of the receiving terminals, and the content of the broadcast service being originated by the network entity, which is not a member of the program specific group.

7. The non-transitory computer-readable storage medium of claim 6, wherein the apparatus is caused, at least in part, to further perform requesting setup of the program specific group at a network entity.

8. The non-transitory computer-readable storage medium of claim 7, wherein the apparatus is caused, at least in part, to further perform: receiving the address associated with the program specific group from the network entity.

9. The non-transitory computer-readable storage medium of claim 8, wherein the broadcast service provides digital video broadcast data and the apparatus is caused, at least in part, to further perform the following steps:

receiving the chat conversation content as audio from the network entity;
converting the chat conversation content to text; and
delivering the text to the at least one receiving terminal.

10. The non-transitory computer-readable storage medium of claim 8, wherein the broadcast service provides digital video broadcast data and the apparatus is caused, at least in part, to further perform the following steps:

receiving the chat conversation content as audio from the network entity; and
determining to deliver the chat conversation content to the at least one receiving terminal along with audio corresponding to the at least one program.

11. An apparatus comprising:
at least one processor; and
at least one memory storing computer program code,
the at least one memory and the computer program code configured to, with the at least one processor, cause the apparatus to perform at least the following:
control transmission of interactive service content to a first network entity and reception of the interactive service content from the first network entity in response to activation of an interface element,
determine to present the interactive service content from the first network entity along with broadcast service content,
wherein the interactive service content is shared among members of a program specific group and the broadcast service content is originated from the first network entity, which is not a member of the program specific group, and
wherein the interactive service content includes chat conversation content being capable of origination at a receiving terminal of one of the members.

12. The apparatus of claim 11, wherein the interactive chat service is received substantially simultaneous with reception of the broadcast service content.

13. The apparatus of claim 11, wherein the broadcast service content is digital video broadcast data.

14. The apparatus of claim 13, wherein the processor is configured to, via the computer program code, cause the apparatus to transmit the chat conversation content as audio and receive the chat conversation content as text.

15. The apparatus of claim 13, wherein the apparatus is further caused, at least in part, to determine to transmit the chat conversation content as audio and receive the chat conversation content as audio.

16. The apparatus of claim 13, wherein the apparatus is further caused, at least in part, to access a second network entity to determine which other mobile terminals are available to join in a chat conversation.

17. The apparatus of claim 11, wherein the apparatus is in communication with the first network entity which is a chat server.

18. The apparatus of claim 11, wherein the apparatus is further caused, at least in part, to receive the broadcast service content and the interactive service content from a digital broadcast provider.

19. The apparatus of claim 18, wherein the apparatus is further caused, at least in part, to access a chat group via a uniform resource locator (URL) in a programming guide of the digital broadcast provider.

20. An apparatus comprising:
at least one processor; and
at least one memory including computer program code,
at least one memory and the computer program code configured to, with the at least one processor, cause the apparatus to perform at least the following:
at least partially control a transmitter configured to communicate broadcast content of a broadcast service to members of a program specific group including a plurality of receiving terminals;
determine to provide a program guide including at least one program of the broadcast service including an address associated with the program specific group to at least one receiving terminal that is a member of the program specific group; and
determine to transmit data of the broadcast service for presentation at the at least one receiving terminal along with interactive service content, wherein the interactive service content includes chat conversation content being capable of origination at one of the receiving terminals, and the data of the broadcast service being originated by the transmitter, which is not a member of the program specific group.

21. The apparatus of claim 20, wherein the the apparatus is further caused to request setup of the program specific group at a network entity.

22. The apparatus of claim 21, wherein the the apparatus is further caused, at least in part, to receive the address associated with the program specific group from the network entity.

23. The apparatus of claim 22, wherein the broadcast service provides digital video broadcast data and wherein the apparatus is further caused to:

receive the chat conversation content as audio from the network entity;
convert the chat conversation content to text; and
determine to deliver the text to the at least one receiving terminal.

24. The apparatus of claim 22, wherein the broadcast service provides digital video broadcast data and wherein the apparatus is further caused to:

receive the chat conversation content as audio from the network entity; and deliver the chat conversation content to the at least one receiving terminal along with audio corresponding to the at least one program.

* * * * *